May 8, 1923.
C. E. GILBERT
AUTOMOBILE SEAT
Filed Aug. 27, 1921
1,454,232
2 Sheets-Sheet 1
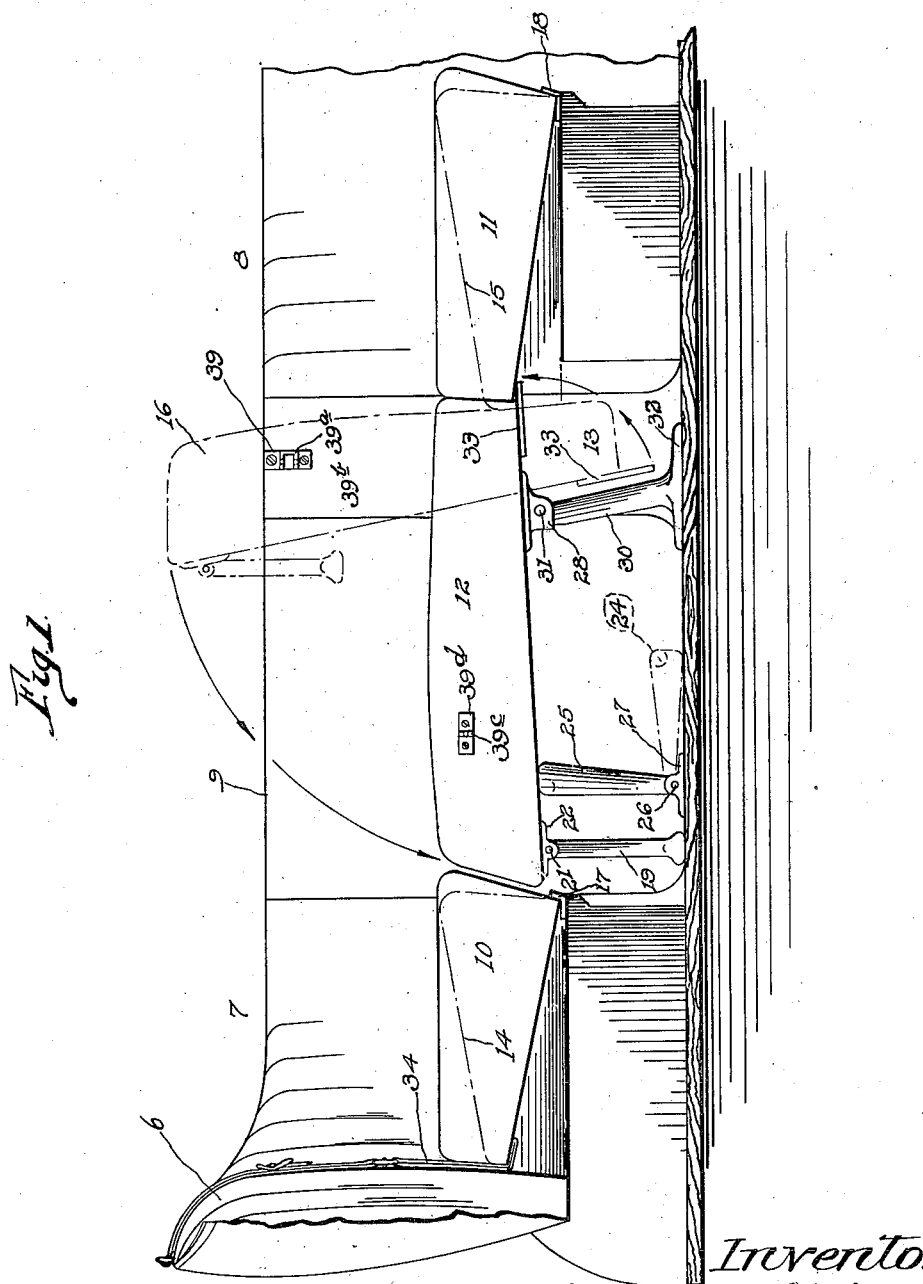
Inventor
Charles E. Gilbert
By Jno. G. Elliott
Atty May 8, 1923.
C. E. GILBERT
AUTOMOBILE SEAT
Filed Aug. 27, 1921
1,454,232
2 Sheets-Sheet 2
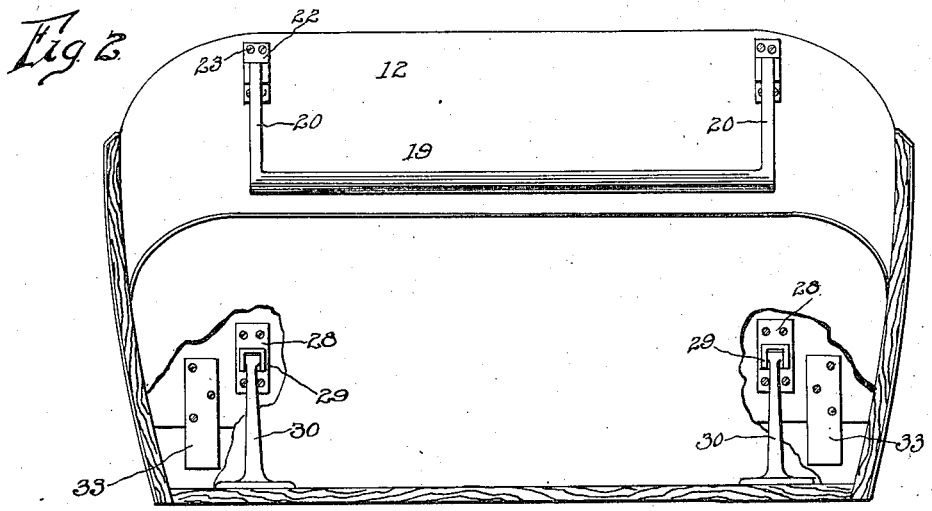
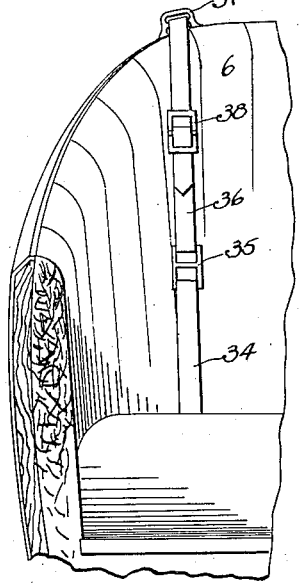
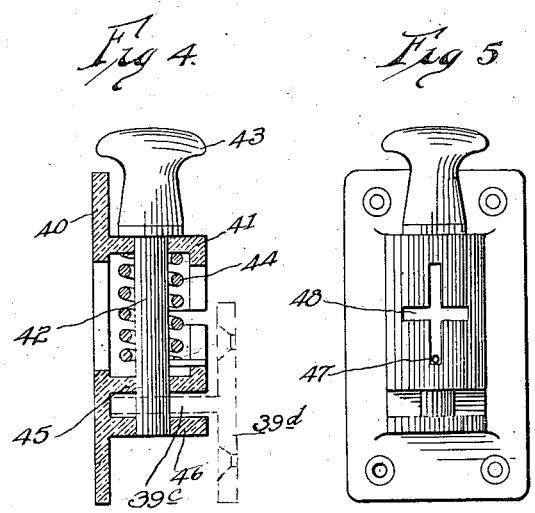
Inventor
Charles E Gilbert
By Jno. G. Elliott
Atty Patented May 8, 1923.

1,454,232

UNITED STATES PATENT OFFICE.

CHARLES E. GILBERT, OF CHICAGO, ILLINOIS.

AUTOMOBILE SEAT.

Application filed August 27, 1921. Serial No. 496,141.

*To all whom it may concern:*

Be it known that I, CHARLES E. GILBERT, a citizen of the United States, and a resident of the city of Chicago, in the county of Cook and State of Illinois, have invented certain new and useful Improvements in Automobile Seats, of which the following is a specification.

This invention relates to improvements in automobile seats and back, for converting them into a sleeping bed or couch.

The prime object of my invention broadly stated, is to provide a means by which the back of the front seat may be successfully adapted to bridge the usual space between the front and rear seats to form in conjunction therewith a substantial portion of the bed or the couch.

Another object of my invention is to utilize the wrap and lap-robe rack, commonly pivoted to the seat back, and also the footrest likewise pivoted to the floor, for supporting the back in its depressed position.

A further object of my invention is to provide a means by which, when swinging the back for the front seat to a horizontal position, the seat will be automatically lifted from its normally inclined to a horizontal plane.

Another object of my invention is to provide a means by which the back seat of an automobile may be adjusted from its normally inclined to a position in a plane with the adjacent horizontal surface of the back for the next seat in front thereof, and at any angle adapting it either for a head rest or a back rest for the occupant reclining on the front seat and the back therefor.

With these ends in view, my invention finds embodiment in certain features of novelty in the construction, combination and arrangement of parts by which the said objects are attained, all as hereinafter fully described with reference to the accompanying drawings and more particularly pointed out in the claims.

In said drawings,—

Fig. 1 illustrates, in side elevation, the upholstered body of an automobile with one of its vertical sides removed.

Fig. 2 is a section taken transversely through the body of an automobile, showing the garment and blanket rack, pivoted, as usual, to the back of the front seat, with parts broken away to show the floor support for and pivoted to the back, and the plates by which the rear of the front seat is automatically lifted by the back when swinging the latter away from said seat.

Fig. 3 is a detail section, showing a front elevation, means for adjusting and securing the upholstered back seat of an automobile in its several adjusted positions provided for by my invention.

Fig. 4 is a vertical section through the casing of the latch bolt for locking the said back in its operative upright position.

Fig. 5 is a front elevation of the latch shown in Fig. 4.

The upholstered portion of the back 6, side 7, front section 8, with the door 9 between, the rear seat 10, the front seat 11 and the back 12 for the latter, are of the usual construction except that the back 12, in its operative position as such, extends in a plane substantially below the seat, as indicated at 13 by dotted lines.

In their normally operative position, the rear seat 10 inclines, as usual, as respectively indicated by the dotted lines 14 and 15, as does the back 12, as indicated at 16, the back and front seats being prevented from moving forward, as usual, by means of angle plates, respectively indicated at 17 and 18, when, for any reason, it is desirable to swing them forwardly upward for access to articles stored beneath these seats or for the purposes of my invention.

Suspended from the back 12 is a swinging rack for wraps, lap-robes, etc., consisting, as usual, of a bar 19, parallel arms at each end extending at a right angle thereto, secured (see Fig. 1) by a pivot 21 to spaced brackets 22—22 adjacent the upper edge of the back 12 of said screws 23 or other suitable devices.

Supported by the floor of the automobile is a foot rest for the occupant of the back seat, consisting as usual, of a rod 24, provided at each end with parallel arms 25, projecting at a right angle thereto, secured by a pivot 26 to brackets 27 mounted upon and fixed to the floor of the automobile body.

This foot rest is also provided with the usual means (not shown) for adjusting it to any plane between the horizontal position indicated by dotted lines in Fig. 1 to a substantially vertical position, as shown by full lines in the same figure, and as a result of which the foot rest and the swinging rack are adapted to provide, as it were, foldable legs for supporting the back 12 in its horizontal position shown, when swung from its upright to the horizontal position shown in Fig. 1.

Secured to the bottom or forward edge of the back 12 are spaced brackets 28—28, provided with outwardly projecting U-shaped flanges 29—29, between the parallel members of which project legs 30—30 hinged thereto by means of pivots 31—31, which legs are set forward as far as possible and inclined rearwardly to give as much foot space as possible, and are preferably provided with a broad base 32 for stabilizing purposes.

In short, the brackets 28 and the posts 30 provide a hinge connection between and for supporting the back from the floor and whereby the back is swung from its normally upright to its horizontal position.

Secured to the rear surface of the back 12, between the posts 30 and the sides of the body of the automobile, are flat plates 33 projecting beyond the adjacent edge of the back 12, the projecting ends of which plates are adapted to engage and lift the front seat from its inclined position indicated by the dotted lines 15 to a horizontal position in a plane with the back 12, when it has completed its movement to the same plane, and so that, on returning the back 12 to its upright position, the front seat 11 will be supported by the plates 33 until depressed sufficiently below the seat 11 for it to assume its normally inclined position for the driver when seated thereon, the forward displacement of the seat being in the meantime prevented by the angle plate 18, forming, so to speak, a pivotal support for the front edge of the seat.

Having described the wrap and robe rack and the foot rest conjointly supporting the back in its depressed position, it is here to be noted that either one, to the exclusion of the other, is alone adapted to perform that supporting function.

Attached by any suitable means to the rear edge of the rear seat 10, at one end, is a folded strap 34, in turn attached to a ring 35, connected by a double strap 36 passing through a ring or guide 37, secured to the top edge of the back 6 for the rear seat 10, one end of which strap is attached to a buckle 38, with its free end passing through the buckle and adjustable therein for suspending the rear seat when elevated to a plane with or at any angle relative to the horizontal position occupied by the seat 11 and back 12, or at any angle thereto adapting it for either a head rest or back rest, and, if need be, for suspending the rear seat 10 in its normal operative position indicated by the dotted lines 14.

For locking the back 12 in its operative upright position, a plate 39, provided with a projecting U-shaped flange 39$^a$ may be secured to the fixed portion 39$^b$ of the body of the automobile, the flange of which plate is adapted to be engaged by a lug 39$^c$ projecting from a plate 39$^d$ secured to the ends of the back 12.

In practice, however, it is preferred to use the devices shown in Figs. 4 and 5, consisting of a plate 40 integrally formed with a casing 41 for a slide bolt 42, provided with a handle 43 and a spring 44 and adapted to be projected through the bottom 45 of the casing and a flange 46 projecting from the plate 40 in a parallel plane with and below the bottom 45 and forming a female member adapted to receive the lug or male member 39$^c$ projecting from the plate 39$^d$.

As a simple and effective means for withdrawing the bolt from its engagement with the lug 39$^c$ and the flange 46, the bolt is provided with a pin 47, projecting through a slot 48 in the casing 41, which, for convenience of milling, has the form of a passion cross, notwithstanding that only the horizontal member and the vertical member projecting below the same are concerned with the operation of the bolt.

In other words, when the pin is in the position shown in Fig. 5 at the bottom of the cross, the bolt is in its locking position shown in Fig. 4, and when the bolt is lifted until the pin 47 is in a plane with the horizontal cross member, the bolt is elevated above and disconnected from the plate 38, and if, while in this position, it is turned either way to occupy the horizontal slot, the bolt will be held in its elevated position against accidental engagement with the lug 39$^c$.

In operation, for converting the front and rear seats and the back for the front seat of an automobile for use as a bed, the foot rest, if such is selected, is first moved from its operative horizontal position to the upright position shown in Fig. 1, and this is followed by withdrawing the bolt free and clear of the perforated lug 39$^c$ and moving the back on its supporting hinge to a horizontal position, while in the meantime the rack 19, if used instead of the foot rest, has swung by gravity to contact with the floor support and the plate 33 has lifted the seat 11 from its rearwardly inclined to the horizontal position shown in Fig. 1.

Following the lowering of the back and the elevation of the front seat, as above described, the rear seat 10, if desired, is lifted at its rear end on the fulcrum formed on the plate 17 at its forward end to a position at any angle that may be desired with reference to the plane of the horizontal top surfaces of the seat 11 and its back 12, which rear seat is secured to whatever elevation it may have by means of its adjustable strap connection with the top for the back seat.

From frequent touring in my automobile, when hotels were inaccessible, or camping out was preferred, I have found, and others have found, that, with the seats and back of my automobile convertible into a bed, as they are, and as above described, and which requires but little cost, a more than ordinarily comfortable bed may be made in about one or two minutes, and that after being used for any length of time, such rear and front seats and the back are quickly reconvertible to their normal operative position and arrangement.

My invention, however, as described herein, is not limited to the detailed construction of the devices herein described and shown by which the seats and the back of the front seat of an automobile may be converted into a bed, but includes any devices adapted therefor, except in so far as it may be limited by the claims made for the protection of my invention.

Having described my invention, what I claim and desire to secure by Letters Patent is:

1. The combination with the front seat, the back seat, and a front seat-back for an automobile, of a floor supported leg pivoted to said front seat-back at a point removed from the lower end thereof a distance substantially equal to the distance at which the pivot is removed from the edge of the front seat.

2. The combination with the front seat, the back seat, and a front seat-back for an automobile, of a floor supported leg pivoted to said front seat-back at a point removed from the lower end thereof a distance substantially equal to the distance at which the pivot is removed from the edge of the front seat, and a swinging wrap rack adjacent the opposite edge of the front seat-back adapted to provide a supplemental floor support for the back in its operative depressed position.

3. The combination with the front seat, the back seat, and a front seat-back for an automobile, of a floor supported leg pivoted to said front seat-back at a point removed from the lower end thereof a distance substantially equal to the distance at which the pivot is removed from the edge of the front seat, and an adjustable foot-rest supported by the floor adapted to be swung to a position of support for the back in its depressed position.

In witness whereof, I have hereunto set my hand this 25th day of August, 1921.

CHARLES E. GILBERT.